US009399316B2

(12) United States Patent
Chang

(10) Patent No.: US 9,399,316 B2
(45) Date of Patent: Jul. 26, 2016

(54) HOUSING FOR PORTABLE ELECTRONIC DEVICE AND METHOD OF MANUFACTURING THE SAME

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/518,486

(22) Filed: Oct. 20, 2014

(65) Prior Publication Data
US 2015/0189769 A1    Jul. 2, 2015

(30) Foreign Application Priority Data

Dec. 26, 2013    (CN) .......................... 2013 1 0739452

(51) Int. Cl.
| H05K 5/00 | (2006.01) |
| H05K 7/00 | (2006.01) |
| G06F 1/16 | (2006.01) |
| G06F 1/20 | (2006.01) |
| H04M 1/00 | (2006.01) |
| B29C 45/14 | (2006.01) |
| B29K 709/08 | (2006.01) |

(52) U.S. Cl.
CPC ..... *B29C 45/14434* (2013.01); *B29C 45/14221* (2013.01); *B29C 2045/14237* (2013.01); *B29K 2709/08* (2013.01)

(58) Field of Classification Search
USPC .......... 361/679.09, 679.3, 679.56; 455/575.8; D14/440
See application file for complete search history.

(56) References Cited

U.S. PATENT DOCUMENTS

| 7,869,206 | B2 * | 1/2011 | Dabov | G06F 1/1626 361/679.55 |
| 8,403,136 | B1 * | 3/2013 | Tsai | H05K 5/061 361/679.3 |
| 8,509,865 | B1 * | 8/2013 | LaColla | H04M 1/04 455/556.1 |
| 8,623,494 | B2 * | 1/2014 | Richardson | H04B 1/3888 206/521 |
| 8,755,852 | B2 * | 6/2014 | Hynecek | A45C 11/00 455/575.8 |
| 8,774,882 | B2 * | 7/2014 | Tages | H04M 1/0283 455/575.8 |
| 2004/0119390 | A1 * | 6/2004 | Huang | B29C 45/1676 312/352 |

(Continued)

FOREIGN PATENT DOCUMENTS

| TW | M412163 U1 | 9/2011 |
| TW | 201226150 A1 | 7/2012 |

*Primary Examiner* — Chau N Nguyen
*Assistant Examiner* — Roshn Varghese
(74) *Attorney, Agent, or Firm* — ScienBiziP, P.C.

(57) ABSTRACT

A housing of portable electronic device includes a glass member and a plastic member formed in the glass member. The glass member includes a base plate, a plurality of sidewalls substantially vertically extending from the base plate. Each two neighboring sidewalls form a gap portion. The base plate includes a first inner surface, and each sidewall includes a second inner surface and an outer surface opposite the second inner surface. The plastic member fit closely against the first inner surface and the second inner surface. The plastic member further includes at least one protrusion portion positioned at the outer surface of the sidewalls and covered above at least one of the gap portions. A method of manufacturing the housing is also provided.

10 Claims, 9 Drawing Sheets

(56) References Cited

U.S. PATENT DOCUMENTS

| | | | | |
|---|---|---|---|---|
| 2011/0036876 A1* | 2/2011 | Fathollahi | H04B 1/3888 224/191 |
| 2011/0116220 A1* | 5/2011 | Lee | G02F 1/133308 361/679.02 |
| 2011/0255218 A1* | 10/2011 | Pakula | G06F 1/1626 361/679.01 |
| 2012/0105400 A1* | 5/2012 | Mathew | H04N 5/2251 345/207 |
| 2012/0147556 A1* | 6/2012 | Kwitek | G06F 1/1656 361/679.56 |
| 2013/0076649 A1* | 3/2013 | Myers | H04M 1/0268 361/679.01 |
| 2013/0140965 A1* | 6/2013 | Franklin | G06F 1/1626 312/223.1 |
| 2013/0292378 A1* | 11/2013 | Tages | H05K 5/0086 220/4.02 |
| 2014/0138265 A1* | 5/2014 | Bong | A45C 11/00 206/37 |
| 2014/0221056 A1* | 8/2014 | Gandhi | H04B 1/3888 455/575.8 |

\* cited by examiner

HOUSING FOR PORTABLE ELECTRONIC DEVICE AND METHOD OF MANUFACTURING THE SAME

FIELD

The subject matter herein generally relates to a housing for a portable electronic device, and a method of manufacturing the same.

BACKGROUND

Portable electronic devices, such as mobile phones and tablet computer (tablet PC), have become increasingly popular for general use. A housing of the portable electronic device can be made of plastic or metal. In order to increase the durability and scratch resistance, a housing of the portable electronic device can be made of curved glass.

BRIEF DESCRIPTION OF THE DRAWINGS

Implementations of the present technology will now be described, by way of example only, with reference to the attached figures.

DETAILED DESCRIPTION

Figure 1:
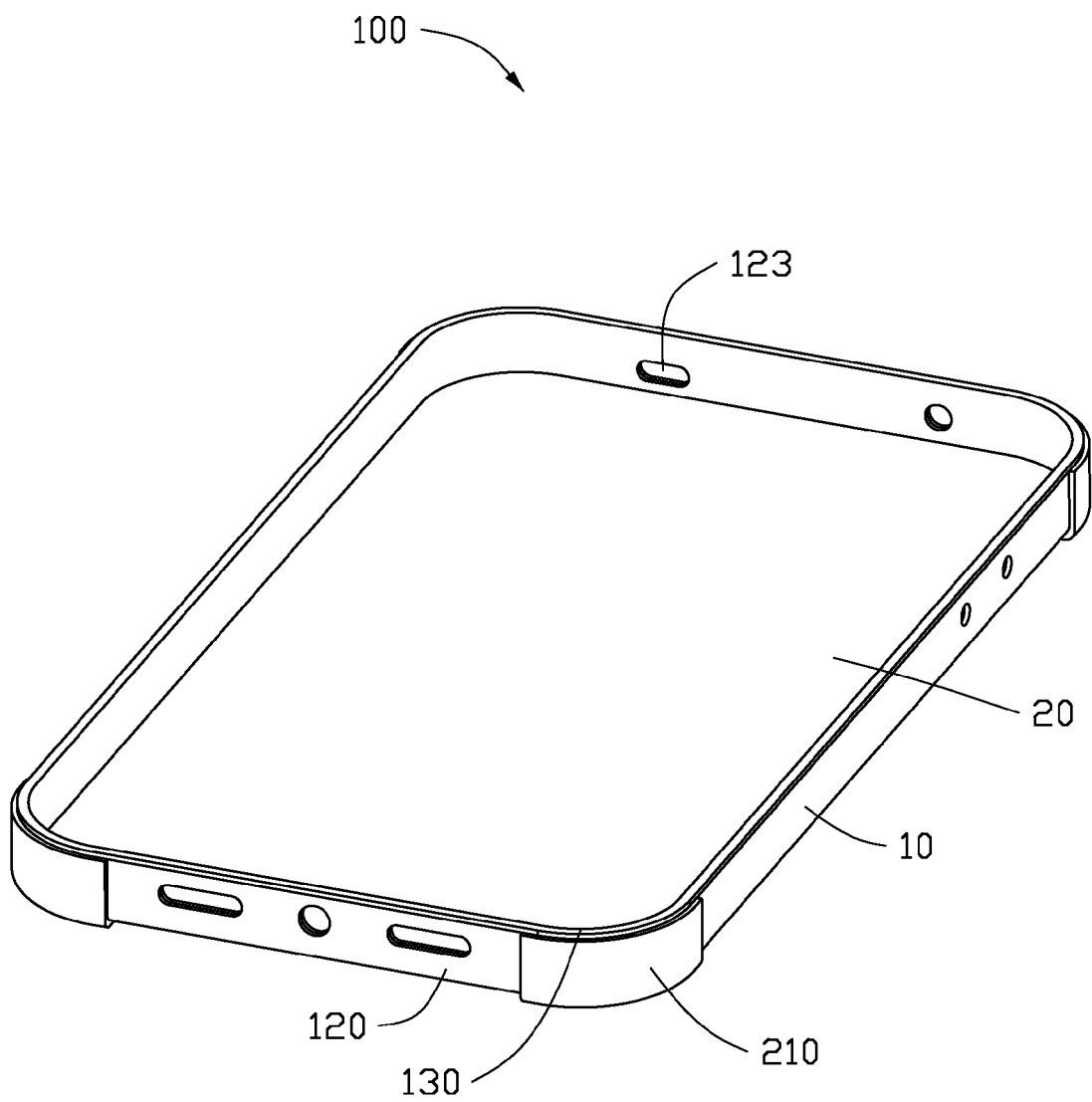
FIG. 1 is an isometric view of an embodiment of a housing for a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other feature that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a housing for a portable electronic device which can be used with various portable electronic devices, such as mobile phones, note books, or tablet PCs.

FIG. 1 illustrates a housing 100 for a portable electronic device including a glass member 10 and a plastic member 20 integrated together. The housing 100 can be substantially rectangular.

Figure 2:
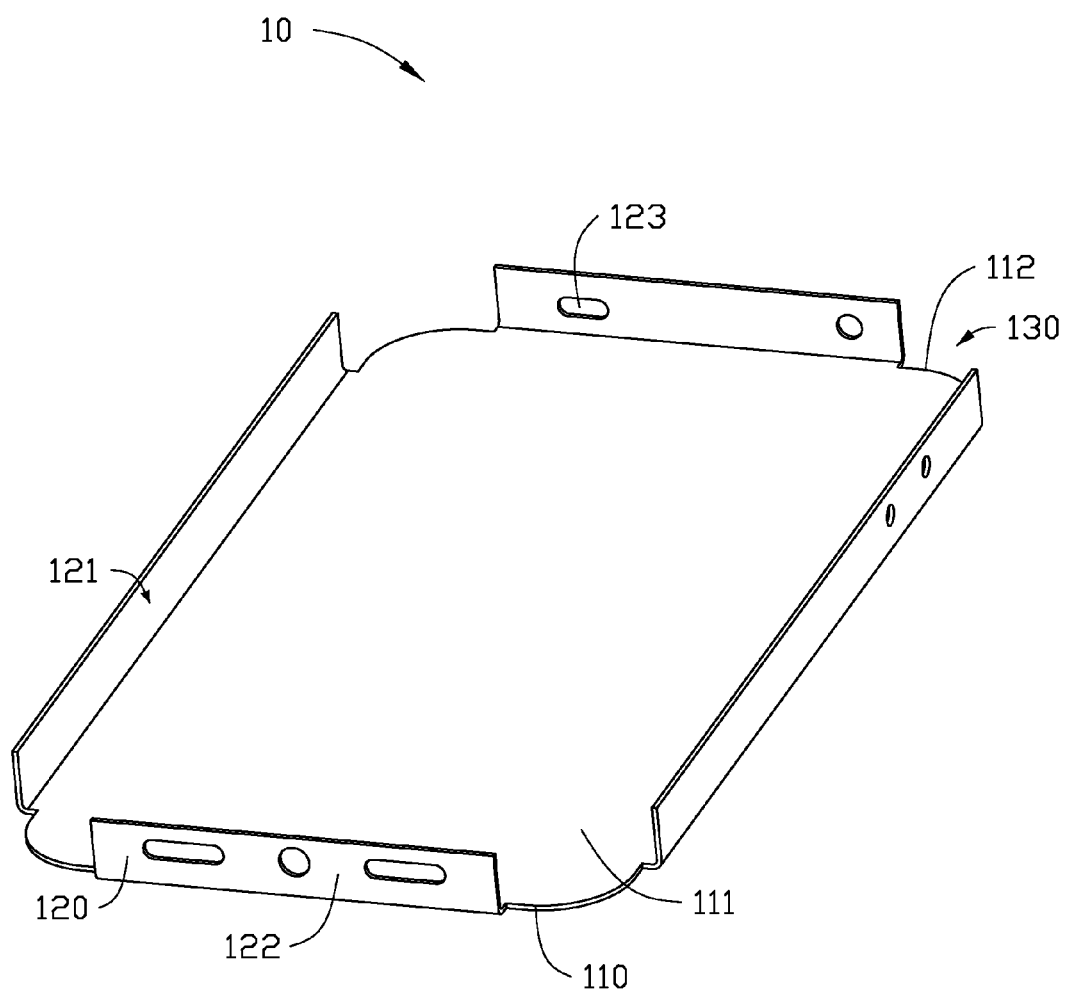
FIG. 2 is an isometric view of a glass member of the housing of FIG. 1.

FIG. 2 illustrates the glass member 10 including a base plate 110 and four sidewalls 120 substantially vertically extending from the base plate 110. The base plate 110 can be substantially rectangular and can include a first inner surface 111 toward the sidewalls 120 and four corners 112. The corners 112 can be arcuate.

Each sidewall 120 can include a second inner surface 121 toward the base plate 110, and an outer surface 122 opposite to the second inner surface. In at least one embodiment, the sidewalls 120 can include a plurality of through holes 123, and the through holes 123 can be used as sound holes or heat dissipation holes.

The sidewalls 120 can be spaced from each other, and the glass member 10 can further include four gap portions 130 corresponding to the corners 112. Each gap portion 130 can be defined between each neighboring pair of sidewalls 120.

Figure 3:
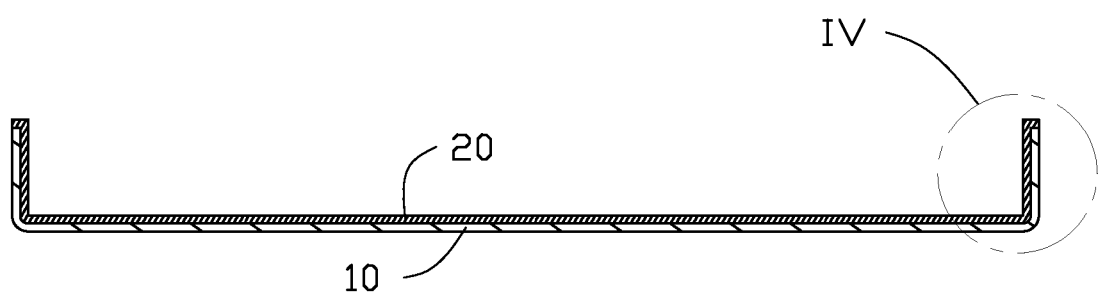
FIG. 3 is a cross-sectional view of the glass member of FIG. 2.

FIG. 3 illustrates that the plastic member 20 can be positioned in the glass member 10 and fit closely to the glass member 10. A shape of the plastic member 20 can be configured to mate with the glass member 10.

Figure 4:
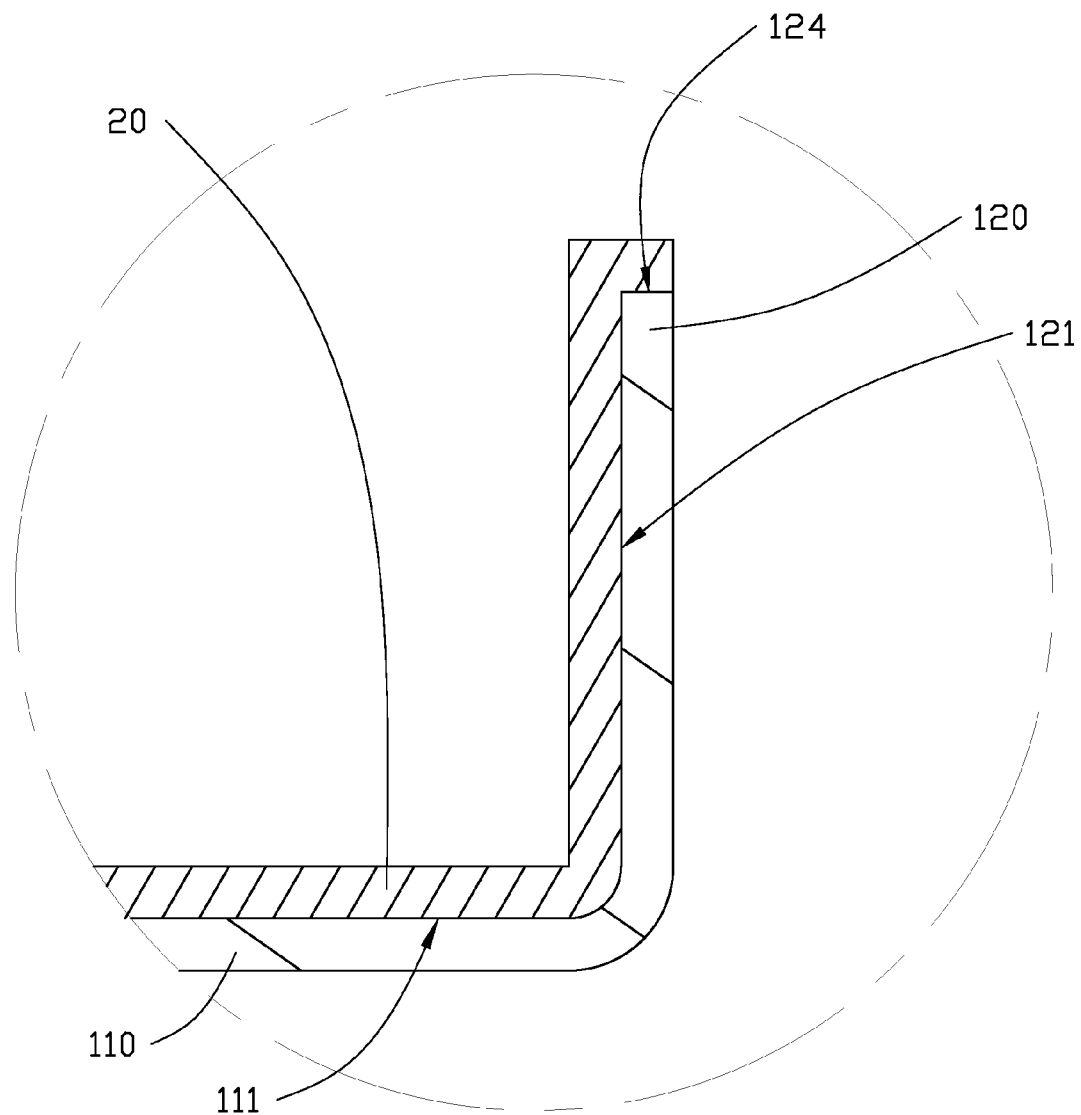
FIG. 4 is an enlarged view of circled portion IV of FIG. 3.

FIG. 4 illustrates that the plastic member 20 can fit closely to the first inner surface 111 of the base plate 110 and the second inner surfaces 121 of the sidewalls 120, thereby the glass member 10 can be covered by the plastic member 20. In at least one embodiment, the plastic member 20 can further cover an end surface 124 of the sidewalls 120 away from the base plate 110. As the glass member 20 can be fully covered by the plastic member 20, the housing 100 is more crash resistant than a conventional housing made of glass alone. Furthermore, as the sidewalls 120 can be substantially vertical to the base plate 110, an inner space of the housing 100 can be larger than the conventional housing made of a curved glass.

In at least one embodiment, FIG. 1 illustrates that the plastic member 20 can further include at least one plastic protrusion portion 210 corresponding to at least one gap portion 130. The plastic protrusion portion 210 can be curved and cover above the gap portion 130 between the sidewalls 120. A size of the plastic protrusion portion 210 can be larger than a size of the gap portion 130, and the plastic protrusion portion 210 can overlap with a part of the sidewalls 120. The through holes 123 can penetrate the glass member 10 and the plastic member 20.

Figure 5:
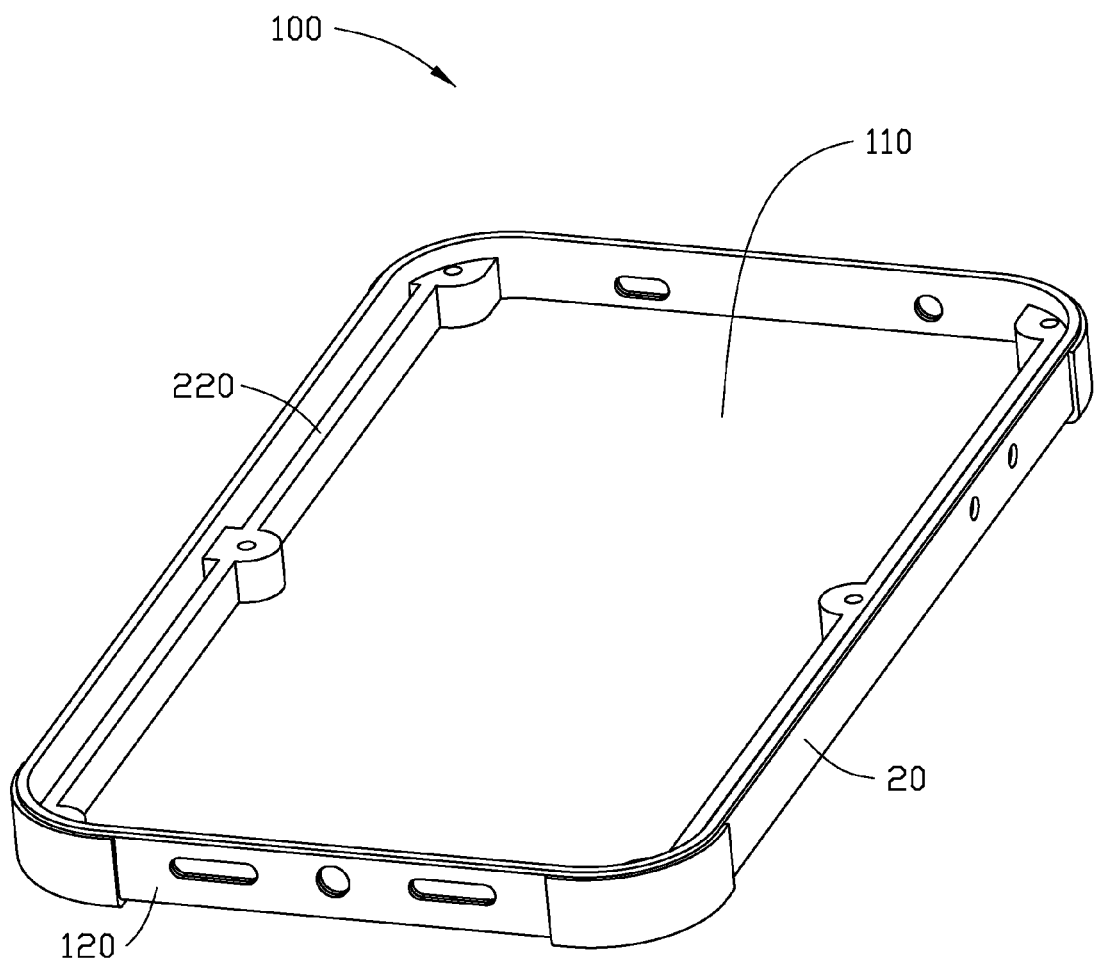
FIG. 5 is an isometric view of another embodiment of a housing for a portable electronic device.

FIG. 5 illustrates the housing 100 in another embodiment. The housing 100 can include at least one plastic assembly portion 220. The plastic assembly portion 220 can be, but is not limited to, a separation plate. The plastic assembly portion 220 can be a clasp, a stud, or another assembly member. The plastic assembly portion 220 can be positioned on the base plate 110 or the sidewall 120, and can be integrated with the glass member 20.

FIGS. 6-9 illustrate an exemplary process for manufacturing the housing 100 in accordance with an example embodiment which is being thus illustrated. The exemplary process is provided by way of example, as there are a variety of ways to carry out the method. The exemplary process described below can be carried out using the configurations illustrated in FIGS. 1 to 5, for example, and various elements of these figures are referenced in explaining example method 300.

Figure 6:
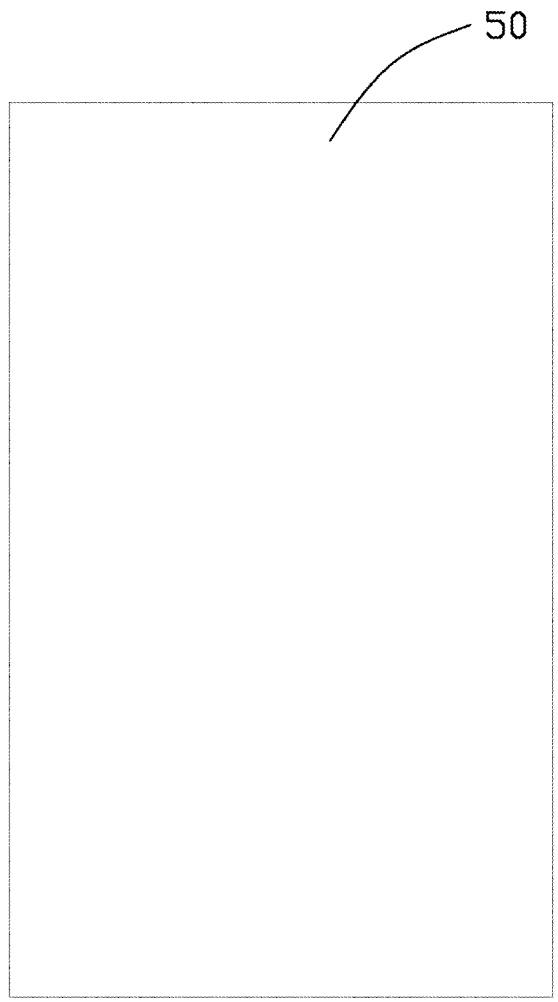
FIG. 6 through FIG. 9 illustrate an exemplary process for manufacturing the housing of FIG. 1.

In FIG. 6, a plate glass 50 can be provided. The plate glass 50 can be rectangular and made of a tempered glass.

Figure 7:
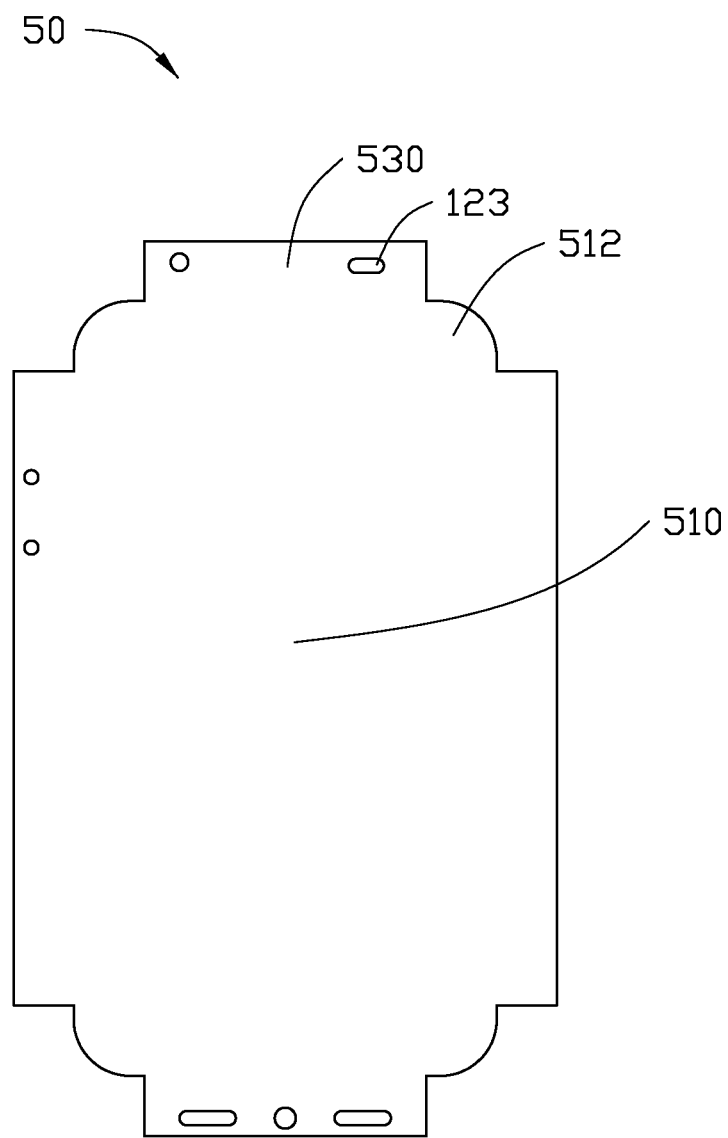

In FIG. 7, the plate glass 50 can be shaped by cutting. In at least one embodiment, the plate glass 50, after cut, can include a main body 510 and four side edges 530. The main body 510 can be substantially rectangular with four curved corners 512. Each side edge 530 can be in the shape of a strip and connected with two curved corners 512. At least one side edge 530 can define a through hole 122.

Figure 8:
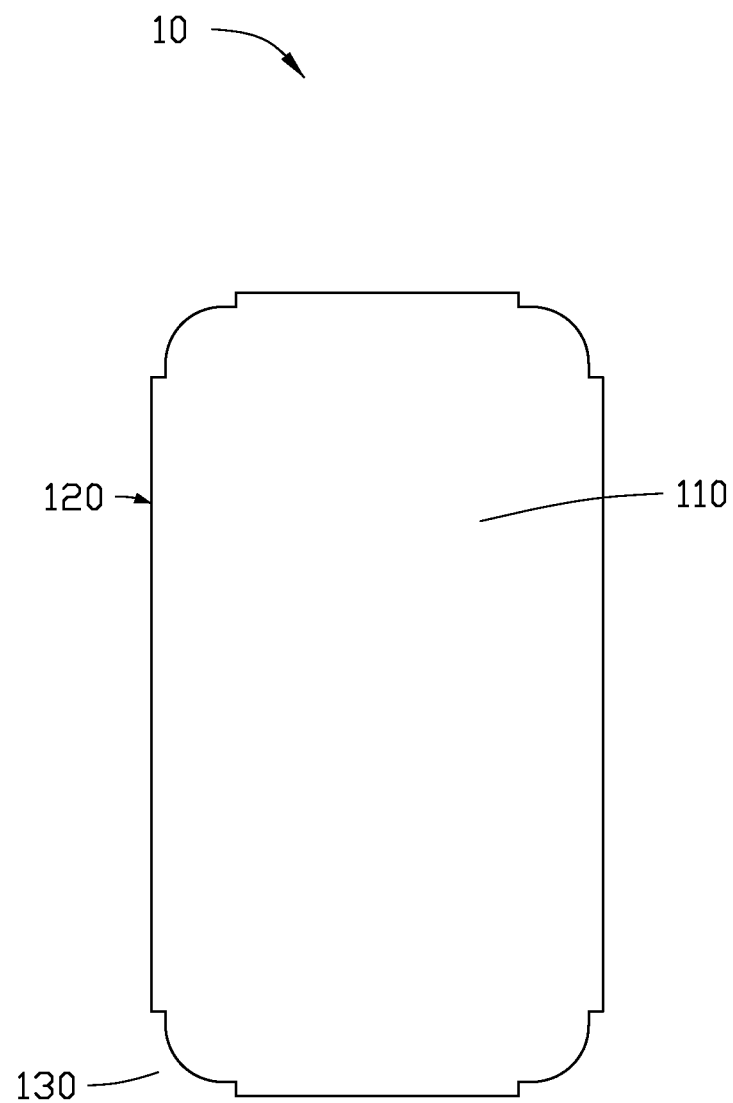
Figure 9:
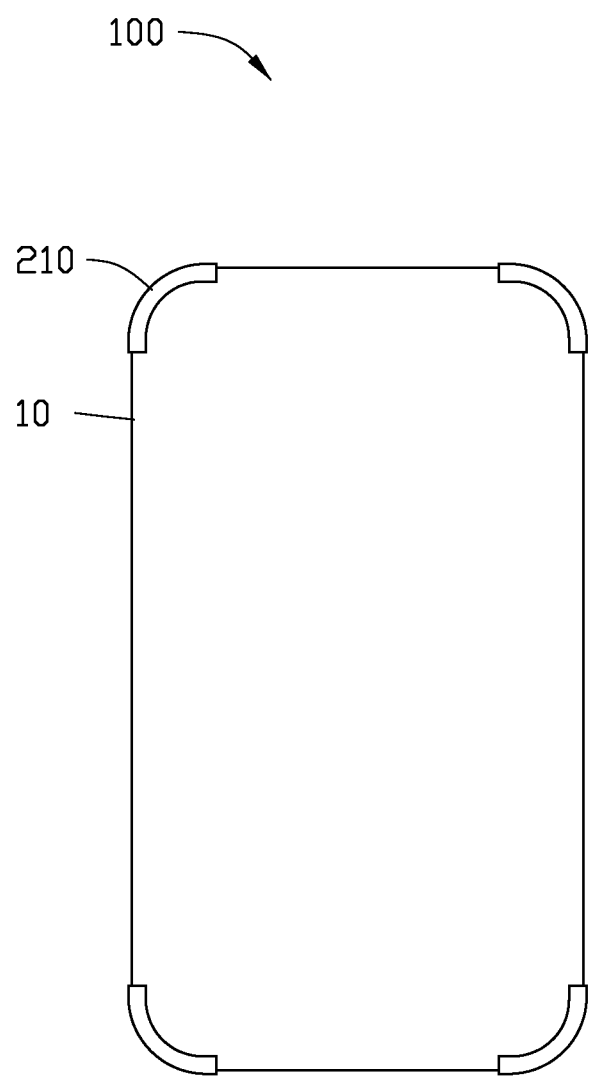

FIG. 8 illustrates that the glass member 10, which can be formed by a thermal bending process. Referring to FIG. 7 and FIG. 8, the side edges 530 can be bent to be vertical to the base plate 510. The main body 510 can be made into the base plate 110, and the four side edges 520 can be formed into the sidewalls 120 substantially vertical to the base plate 110. Four gap portions 130 can be formed between neighbored sidewalls 120. In detail, the plate glass 50 can be heated to a softening point and reshaped under gravity or other external force, then can be naturally cooled. As the side edges 530 are in the shape of a strip and spaced from each other, the side edges 530 can be made into sidewalls 120 vertical to the base plate 110. The glass member 10 can be mirror polished, chemically strengthened, or surface coated to meet the demand of the products.

The plastic member 20 can be integrated formed with the glass member 10. In detail, the glass member 10 can be deposited to a mold (not shown), and a plastic material can be injected to the mold, thereby the plastic member 20 which cover the inner space of the glass member 10 can be formed by insert molding method.

The glass member 10 and the plastic housing 20 can cooperatively define the housing 100. In order to improve the crash resistance of the housing 100, at least one plastic protrusion portion 210 can be formed in the corners of the housing 100.

In other embodiments, the numbers of the sidewalls 120 and the gap portions 130 can be two, or more.

The housing for portable electronic device of this disclosure includes a glass member and a plastic member integrated together, and the plastic member covers the inner space of the glass member, therefore, the housing is more crash resistant than the conventional housing made of glass. As the sidewalls of the glass member are substantially vertical to the base plate, the inner space of the housing is larger than the conventional housing made of curved glass. Furthermore, the plastic member covers the inner space of the glass member and the top ends of the sidewalls, and the plastic protrusion portions covers the corners of the glass member. Whenever a bottom, a side edge, or a corner of the housing heats the ground first, the plastic member can protect the glass member from breaking.

The embodiments shown and described above are only examples. Many details are often found in the art such as the other features of a housing for portable electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A housing for a portable electronic device comprising:
a transparent glass member defining a viewing surface for the portable electronic device, comprising a base plate and a plurality of sidewalls extending substantially perpendicularly there-from, wherein each neighboring pair of the sidewalls forms a gap portion there-between, wherein
the base plate comprises a first inner surface located toward the sidewalls,
each of the sidewalls comprises a second inner surface facing toward the base plate and an outer surface opposite the second inner surface, and
the base plate comprises a plurality of corners, wherein at least one of the corners defines an outward arc shape that is substantially arcuate;
a plastic member configured to be placed in the glass member and configured to fit closely against the first inner surface and the second inner surface, wherein
the plastic member further comprises at least one plastic protrusion portion positioned at the outer surface of the sidewalls and covering over at least one of the gap portions from above,
an end surface of the sidewall away from the base plate is covered by the plastic member, and
an end surface of plastic member is vertically bent to cover the end surface of the sidewall.

2. The housing of claim 1, wherein the gap portions are positioned corresponding to the corners of the base plate.

3. The housing of claim 1, wherein the at least one plastic protrusion portion of the plastic member overlaps a part of the outer surfaces of the sidewalls of the glass member.

4. The housing of claim 1, wherein the plastic member is integrated with the glass member.

5. The housing of claim 1, wherein the housing further comprises at least one assembly portion positioned in the glass member, and the assembly portion is integrated with the plastic member.

6. The housing of claim 5, wherein the assembly portion comprises a clasp.

7. The housing of claim 5, wherein the assembly portion comprises a stud.

8. The housing of claim 1, wherein the sidewall of the glass member further comprises at least one through hole, and the through hole penetrates the plastic member.

9. The housing of claim 8, wherein the through hole is configured to dissipate heat.

10. The housing of claim 8, wherein the through hole is configured to be a sound transmitting hole.

* * * * *